United States Patent [19]
Hayes

[11] Patent Number: 5,929,987
[45] Date of Patent: Jul. 27, 1999

[54] SYSTEM FOR ELIMINATING SCATTERED LIGHT IN AUTOCOLLIMATOR FOR MAGNETIC-HEAD SUSPENSION MEASURING INSTRUMENT

[75] Inventor: John B. Hayes, Tucson, Ariz.

[73] Assignee: Veeco Corporation, Tucson, Ariz.

[21] Appl. No.: 09/121,765

[22] Filed: Jul. 23, 1998

[51] Int. Cl.⁶ .................................................. G01N 15/02
[52] U.S. Cl. .......................... 356/337; 356/152; 356/375
[58] Field of Search .................................... 356/337, 152, 356/375

[56] References Cited

U.S. PATENT DOCUMENTS

| | | | |
|---|---|---|---|
| 5,257,087 | 10/1993 | Furuya | 356/337 |
| 5,480,775 | 1/1996 | Ito et al. | 356/337 |
| 5,636,013 | 6/1997 | Swift | 356/3.03 |

*Primary Examiner*—Frank G. Font
*Assistant Examiner*—Reginald A. Ratliff
*Attorney, Agent, or Firm*—Antonio R. Durando

[57] ABSTRACT

An autocollimator/point-range sensor system produces a linearly polarized light beam that is split into a point-range sensor beam and an autocollimator beam. The linearly polarized point-range sensor beam is utilized to carry out z-position measurements according to prior-art techniques. The autocollimator beam is passed through a quarter-wave plate to introduce a 90-degree phase shift and convert it to circularly polarized light. An analyzer placed in front of the autocollimator detector is positioned such that its transmission axis is offset with respect to the plane of polarization of the linearly polarized point-range sensor beam, thereby blocking any scattered light from the sensor beam while passing a component of the circularly-polarized autocollimator light to reach the detector.

27 Claims, 10 Drawing Sheets

SAT Spot
Without Polarization Isolation

Raw Image From Autocollimator

FIG. 4
(PRIOR ART)

Thresholded Image Used for Computer Analysis

SAT Spot
With Polarization Isolation

Raw Image From Autocollimator

FIG. 10

Thresholded Image Used for Computer Analysis

SYSTEM FOR ELIMINATING SCATTERED LIGHT IN AUTOCOLLIMATOR FOR MAGNETIC-HEAD SUSPENSION MEASURING INSTRUMENT

BACKGROUND OF THE INVENTION

1. Field of the Invention

This invention is related in general to apparatus for measuring angles. In particular, the invention consists of a novel autocollimator system for minimizing the effects of light scattering while measuring the torsional characteristics of magnetic-head suspension assemblies.

2. Description of the Related Art

The magnetic head slider of a magnetic disk system operates by floating in very close proximity over the surface of the magnetic disk, thereby accurately reading and writing data thereon. While the magnetic head slider is floating disposed substantially in parallel over the disk during operation, it must be able to adjust its attitude to conform to magnetic-disk surface imperfections and dynamic displacements, such as surface vibrations generated by the rotating movement. Therefore, the torsional characteristics of the suspension supporting the slider are critical to the proper functioning of the apparatus and must be maintained within prescribed design specifications to prevent contact with the disk surface and avoid disabling consequences that may result from any such event.

Figure 1:
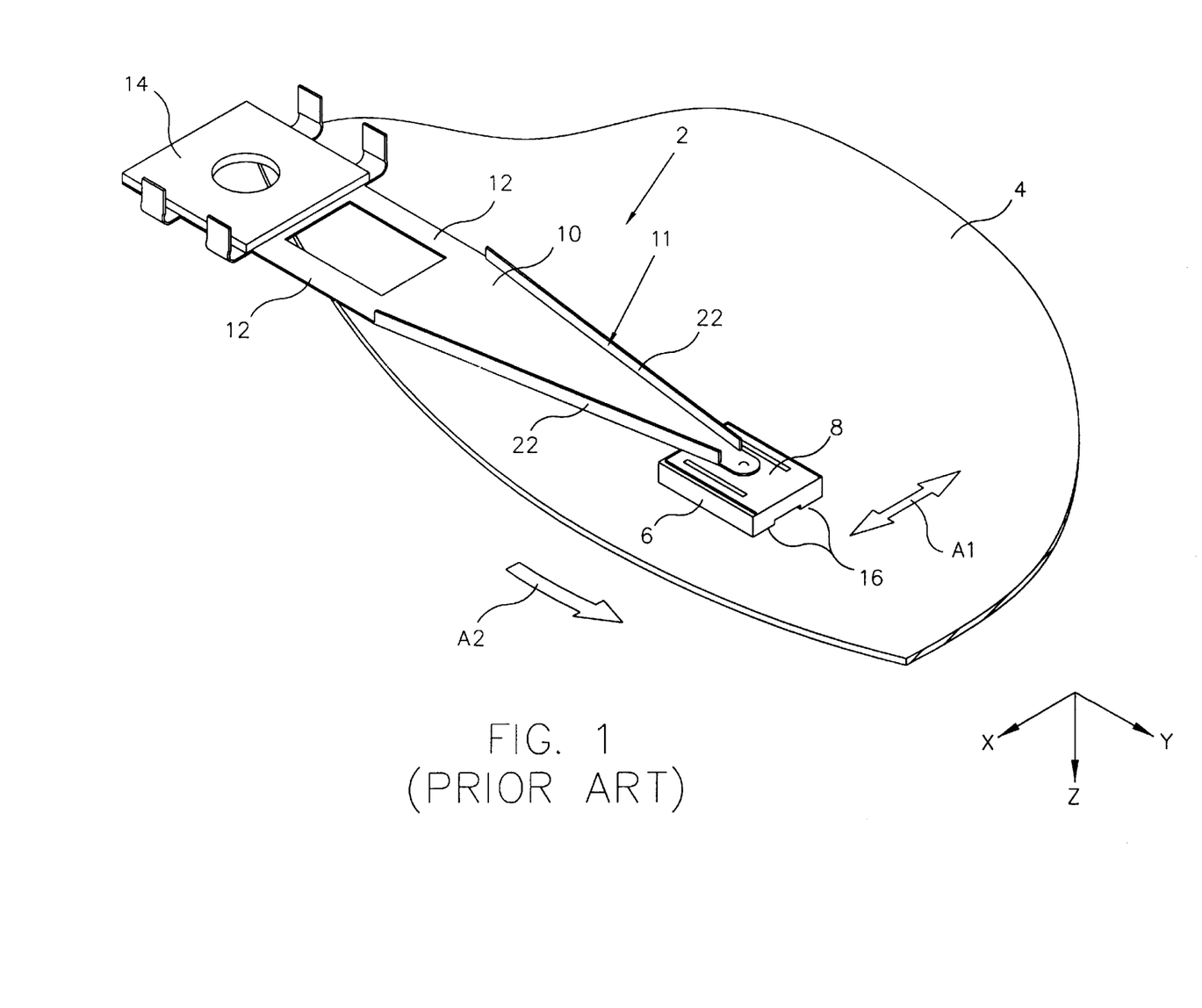
FIG. 1 is a simplified schematic representation of a conventional head gimbal assembly operating on a magnetic disk.

For illustration, FIG. 1 shows in perspective view a conventional magnetic head gimbal assembly 2 (HGA) positioned over a magnetic disk 4. The head gimbal assembly 2 consists of a slider 6 mounted on a gimbal 8 which is either integral with or rigidly connected to a load beam 10 that comprises a pre-load region 12 and formed rails 22 that provide rigidity to the assembly. The combined gimbal and load beam, which constitute the suspension 11, support the slider portion of the head gimbal assembly. The suspension is in turn attached to a driving mechanism (not shown) by means of a screw or swage mount 14. In operation, the head gimbal assembly 2 is moved by the driving mechanism along the radius of the magnetic disk 4 (arrows A1) so that the slider 6 may be placed rapidly over the appropriate read/write tracks in circumferential direction with respect thereto as the disk is rotated in the direction of arrow A2.

For ease of description, the radial, tangential and vertical directions with respect to the surface of disk 4 are referenced in the figures by x, y and z coordinates, respectively. Thus, the magnetic head slider 6 is supported by the gimbal 8 for controlling pitching and rolling movements as the slider's position changes in the radial (x axis) and circumferential (y axis) directions of the magnetic disk 4. When the magnetic disk is rotated, an air spring is created by the air flowing between the surface of the disk and the rails 16 in the magnetic head slider 6, and the torsional characteristics (roll) of the suspension 11 and gimbal 8 must be such that the slider maintains its dynamic attitude through surface imperfections and vibrations of the rotating disk.

Each suspension consists of a metal portion that is formed from a very thin (in the order of 0.05 mm) metal sheet of homogeneous physical structure, thereby producing suspensions and load beams expected to have uniform torsional characteristics. The suspensions are strategically punched or etched to produce desired dynamic responses to forces that cause flexure, and the rigid structural rails 22 are typically formed in the suspension to provide support according to predetermined design criteria. The pre-load region 12 and the gimbal 8 in the suspension are normally bent with respect to the plane of the swage mount 14 to provide a built-in angle toward the disk surface before engagement with the disk 4 (a 13-degree angle is typical). When in use, the suspension is normally displaced to a condition approaching zero-degree deflection. This deflection creates a force against the slider 6 of the assembly that keeps the slider at the desired nominal flying height during operation (see FIG. 1).

As magnetic recording technologies continue to evolve, progressive miniaturization of head gimbal assembly components creates critical challenges. One is the tolerance control on the static attitude parameters of the suspension 11 and gimbal 8 as the slider size is reduced. As the slider 6 becomes smaller, the narrower width between its rails results in smaller differential pressure profiles that produce head gimbal assemblies having flying roll characteristics closely correlated to their static roll attributes. Accordingly, flying attitude characteristics may be predicted well by testing the static attitude of the suspensions under controlled conditions.

Figure 2:
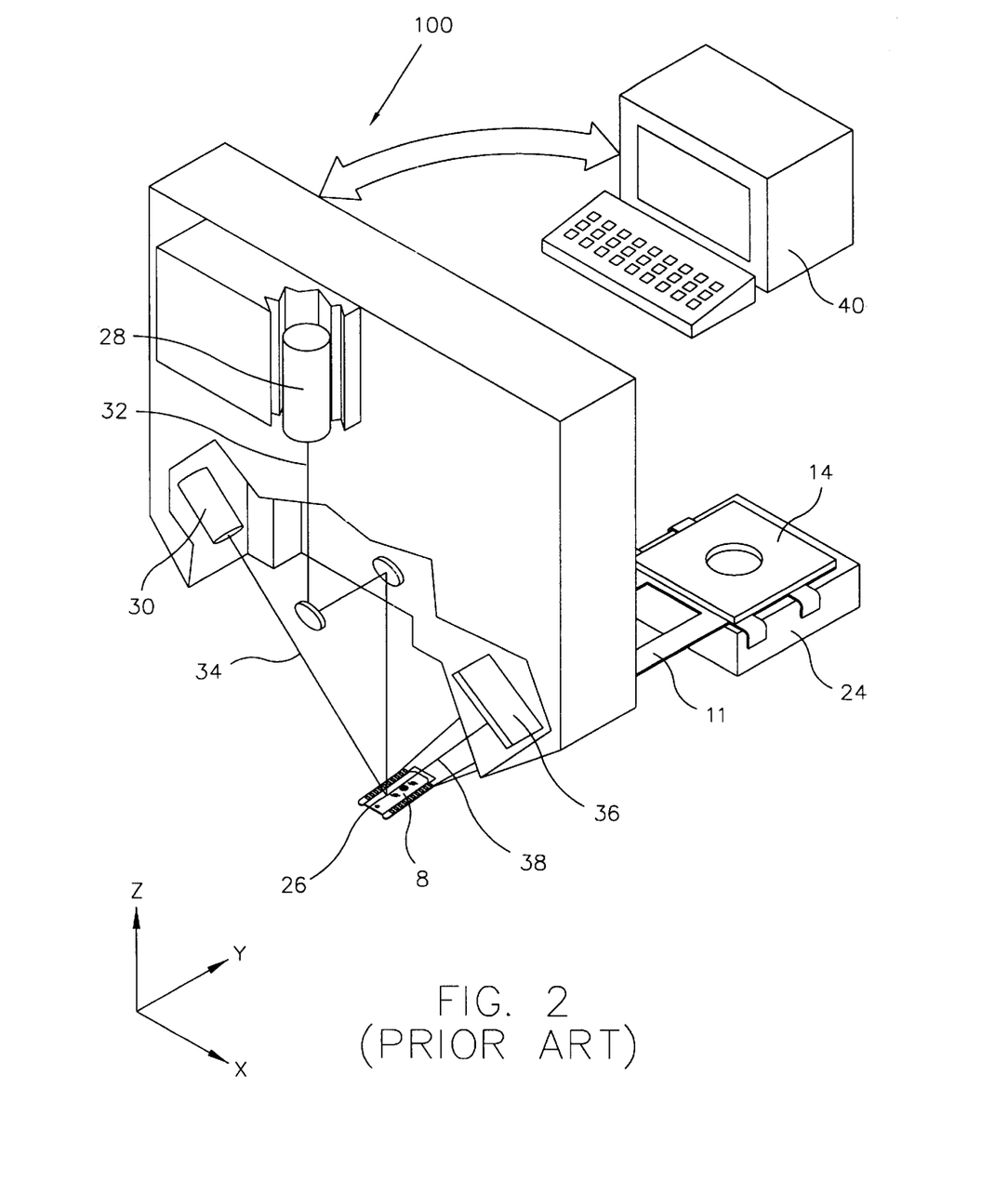
FIG. 2 is a schematic representation of an instrument for making static roll and pitch measurements of a suspension mounted on a supporting base to simulate its flying attitude while operating on a magnetic disk.

Thus, in order to ensure the desired dynamic performance of the suspension (pitch, roll and resonance characteristics), each component of the assembly is manufactured according to specific design specifications and is bench tested for predetermined static parameters. The static attitude of each suspension is measured and compared to allowable tolerances. U.S. Pat. No. 5,636,013 describes an instrument for making such static roll and pitch measurements of a suspension that has been mounted on a supporting base to simulate its flying attitude while operating on a magnetic disk. As illustrated in FIG. 2 in a schematic drawing of such an instrument, the suspension 11 is firmly coupled to the support base 24 through the swage mount 14 and is clamped in a static attitude corresponding to the expected dynamic position in operation. The pitch and roll of a measurement point 26 on the suspension 11 (typically on the gimbal 8) with respect to the support base 24 are then measured by means of a collimated light source 28 and a point-range light source 30 having coincidentally directed beams 32,34. Each light beam is reflected from the measurement point 26 to a corresponding sensor array (such as array 36, receiving the light 38 from the point-range source 30), so that z-height measurements and angle measurements can be obtained by triangulation to determine the roll and pitch characteristics of the gimbal 8. In essence, as clearly understood by those skilled in the art, each measurement consists of determining the exact z position of the measurement point 26 on the surface of the gimbal 8 and the angle of the surface with respect to the support base 24 on which the suspension 11 is mounted. A computer 40 electrically coupled to the autocollimation system and point-range sensor system can be used to perform the necessary calculations in known manner.

Figure 3:
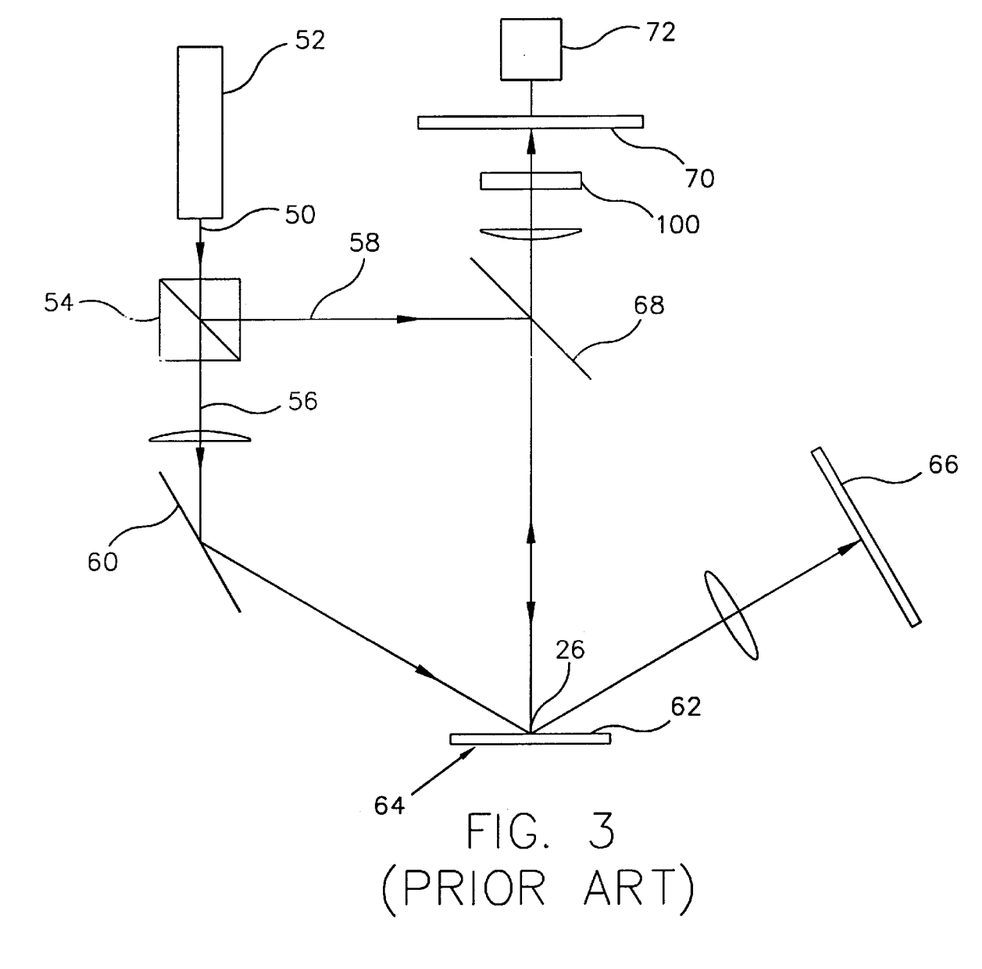
FIG. 3 is a schematic illustration of an autocollimator/point-range sensor system according to the prior art.

FIG. 3 illustrates in schematic form an embodiment of the optical arrangement typically used to implement the autocollimator/point-range sensor system described above. A beam 50 is produced by a single light source 52, typically a solid state laser, and then split by a beamsplitter 54 into a first beam 56 used to carry out the point-range sensor operation and a second beam 58 used to carry out the autocollimation procedure. The beam 56 is reflected by a mirror 60 and directed toward a measurement point 26 on the surface 62 of a test sample 64 (such as the gimbal 8 shown in FIG. 2). The reflection of the beam 56 from the test surface is detected by a sensor array 66 and used by triangulation to determine the z position of the measurement point with respect to a reference plane. The second light beam 58 emerging from the splitter 54 is folded by another splitter 68 and directed substantially orthogonally to the measurement point 26 on the surface 62 of the test sample, so that its reflection, transmitted through the splitter 68 is spotted on a detector 70 and shown on a display screen 72 for measuring the angle of the surface 62 with respect to a known reference surface, as is well understood and practiced in the art. An attenuator 100 is typically used to control the intensity of the light reaching the detector 70.

Figure 4:
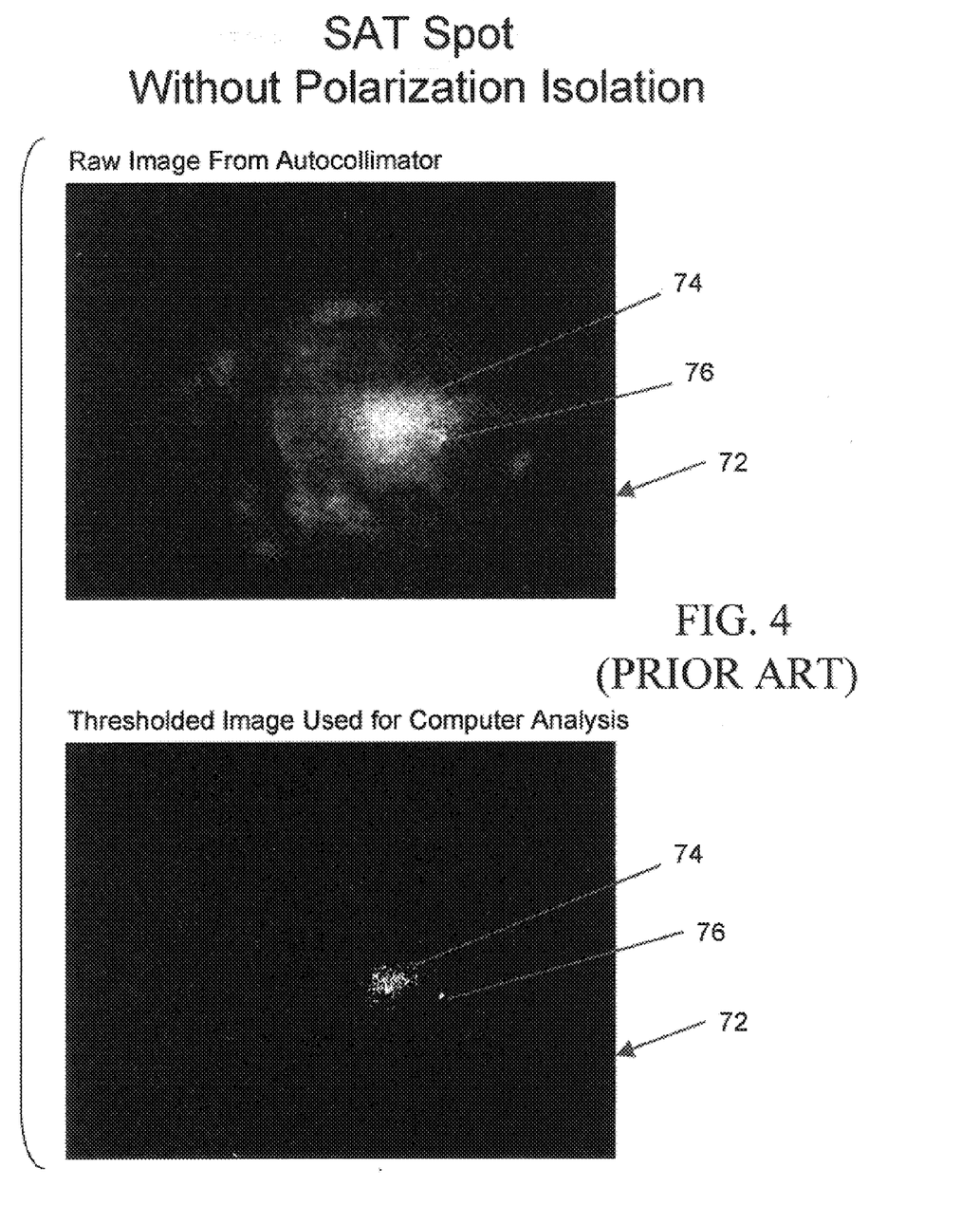
FIG. 4 illustrates a display seen during a measurement showing stray light clouding the image of the autocollimator light reflected from the measurement point on a test surface.
Figure 5:
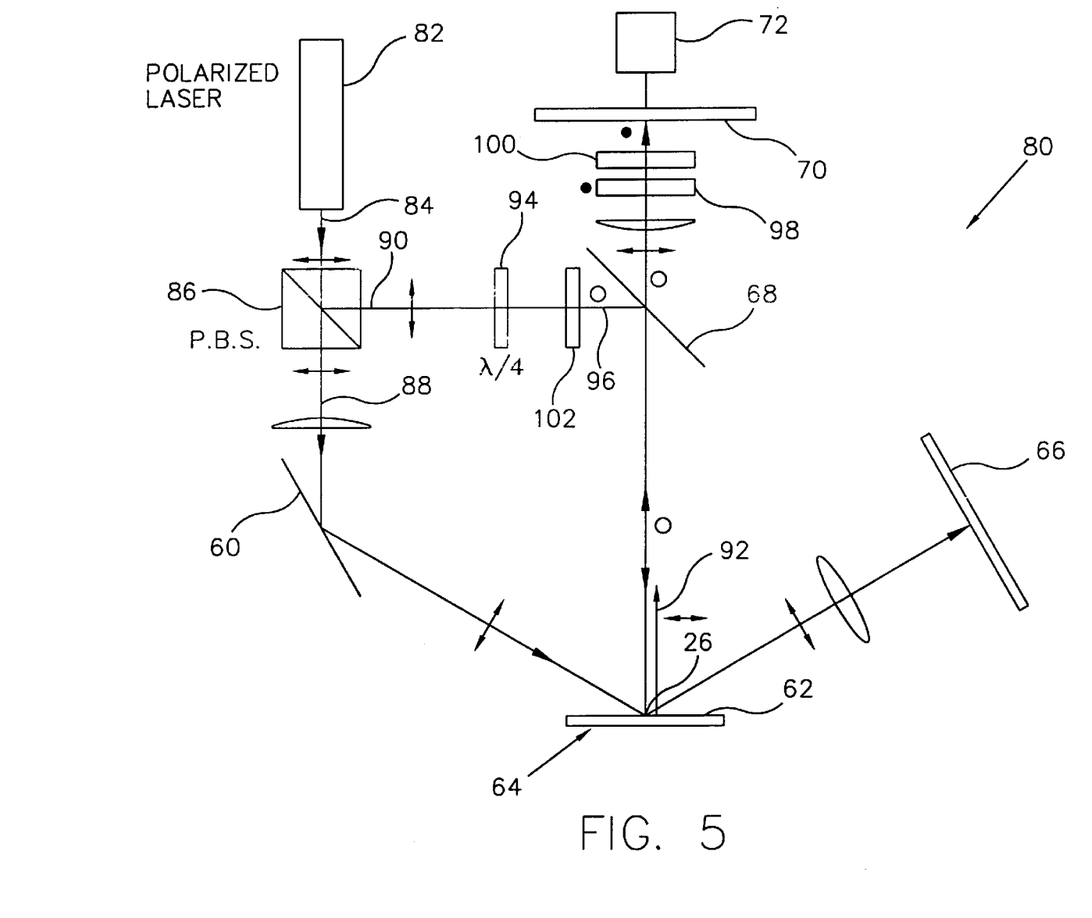
FIG. 5 is a schematic illustration of an autocollimator/point-range sensor system modified according to one embodiment of the present invention, wherein a polarized laser, a polarized beam splitter, a quarter-wave plate and an analyzer are utilized to reduce scattering of the sensor beam in an autocollimator/point-range sensor system.

While the set-up of the prior art is theoretically sound and has proven to be effective and efficient, under certain circumstances it has exhibited problems that diminish its usefulness. In particular, the light from beam 56 may be scattered by surface roughness and interfere with the light from beam 58 reflected at the point of measurement 26, such that the spot produced by the autocollimator light 58 on the sensor 70 may be sufficiently obscured by the stray light from beam 56 to hinder or prevent its identification, either automatically or by an operator observing the display 72. Such a problem is illustrated in FIG. 4, where the image on the display 72 during a measurement shows stray light 74 clouding the image 76 of the autocollimator light reflected from the measurement point 26 on the test surface 62. Another common problem with the embodiment illustrated in FIG. 3 is the effect of stray light on the performance of the light source 52 in the instrument. To the extent that stray rays are be reflected back toward the source 52 by the mirror 68 and the beam splitter 54, they return to the light source and are bounced forward again by its reflective surfaces, thereby producing more scattered light and interfering with the proper illumination of the measurement point. An example of the effect of this phenomenon on the image collected on the display screen 72 is illustrated in FIG. 5.

Therefore, there is still a need for improving the optical characteristics of the autocollimator/point-range sensor system described above. This invention is directed at greatly reducing any interference with the autocollimator beam by light scattered by the point-range sensor beam at the point of measurement on the test surface.

BRIEF SUMMARY OF THE INVENTION

One primary objective of this invention is a device that eliminates or at least minimizes interference between the autocollimator beam and the point-range sensor beam at the measurement point on a test surface.

Another goal of the invention is a system that reduces interference with the proper functioning of the light source produced by stray light returned to it through the optics of the system.

Still another goal is a solution that achieves the objectives stated above within acceptable operating ranges of frequency and intensity of the light used in the instrument.

Another important objective is a solution that is suitable for incorporation in conventional testing equipment.

Finally, an objective of this invention is a device that can be manufactured in an economical and commercially viable manner utilizing components that are either already available or can be constructed at reasonable cost.

Therefore, according to these and other objectives, the present invention consists of an autocollimator/point-range sensor system producing a linearly polarized light beam that is split into a point-range sensor beam and an autocollimator beam. The linearly polarized point-range sensor beam is utilized to carry out z-position measurements according to prior-art techniques. The autocollimator beam is passed through a quarter-wave plate to introduce a 90-degree phase shift and convert it to circularly polarized light. An analyzer placed in front of the autocollimator detector is positioned such that its transmission axis is offset with respect to the plane of polarization of the linearly polarized point-range sensor beam, thereby blocking any scattered light from the sensor beam while passing a component of the circularly-polarized autocollimator light to reach the detector. Thus, the combination of a linearly polarized light source, a quarter-wave plate and an analyzer is effectively utilized to virtually eliminate interference of scattered light on the autocollimation procedure. In addition, the quarter-wave plate also helps prevent scattered light from being transmitted back to the light source.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The inventive aspect of this disclosure lies in the idea of using polarization to distinguish and control two light beams produced by a single source and utilized for angle and z-position measurements in an autocollimator/point-range sensor system. By creating two beams with distinct polarization characteristics, each beam can be separated from the other with appropriate filters, thereby making it possible to eliminate unwanted interference produced by scattered light.

Referring to the drawings, wherein like parts are designated throughout with like numerals and symbols, FIG. 5 illustrates in schematic view the preferred embodiment 80 of the invention, wherein a polarized laser 82 is utilized as the single light source of an autocollimator/point-range sensor system. The linearly polarized (P-state) light beam is partially reflected and partially transmitted by a beam splitter, which may be a polarized beam splitter 86, thereby producing linearly polarized point-range sensor and autocollimator beams 88 and 90, respectively. By rotating the laser 82, it is possible to control the intensities of the beams 88 and 90 as may be most desirable for the system. In practice, splitting the laser light on the basis of 80 percent to the point-range sensor beam and 20 percent to the autocollimator beam produced a well balanced system with desirable signals at the detectors 66 and 70.

For purposes of illustration, a double arrow and a dot are used throughout to exemplify perpendicular planes of linear polarization, as normally done in the art. Also, state of polarization is meant to refer to any specific polarization condition of a light beam, including unpolarized. The P-polarized sensor beam 88 is reflected by a mirror 60 and directed toward a measurement point 26 on the surface 62 of a test sample 64. The reflection of the beam 88 from the test surface is detected by a sensor array 66 and used by triangulation to determine the z position of the measurement point with respect to a reference plane.

The procedure is the same as done in prior art but carried out with a linearly polarized beam of light. It is the scattering of this light from the sample surface 62, illustrated by the beam 92 directed toward the sensor 70, that this invention is designed to minimize. Accordingly, the autocollimator beam 90 emerging from the splitter 86 is passed through a quarter-wave plate 94 to convert it to a circular light beam 96 (either R- or L-state) that is then folded by the splitter 68 and directed substantially orthogonally to the measurement point 26 on the surface 62 of the test sample. Its circularly-polarized reflection, together with any scattered light from beam 92, is transmitted through the splitter 68 and then passed through a crossed-polarizer or analyzer 98 adapted to block the linearly-polarized scattered light from beam 92 and convert the circular beam 96 to linear light spotted on the detector 70 and shown on the display screen 72. In practice, a rotating polarizer 100 is also used to attenuate the intensity of the light shining on the detector 70, if necessary. A neutral density filter 102 may also be used to block stray reflections from the laser 82 that might otherwise reach the sample surface and produce additional scattered light.

Figure 6:
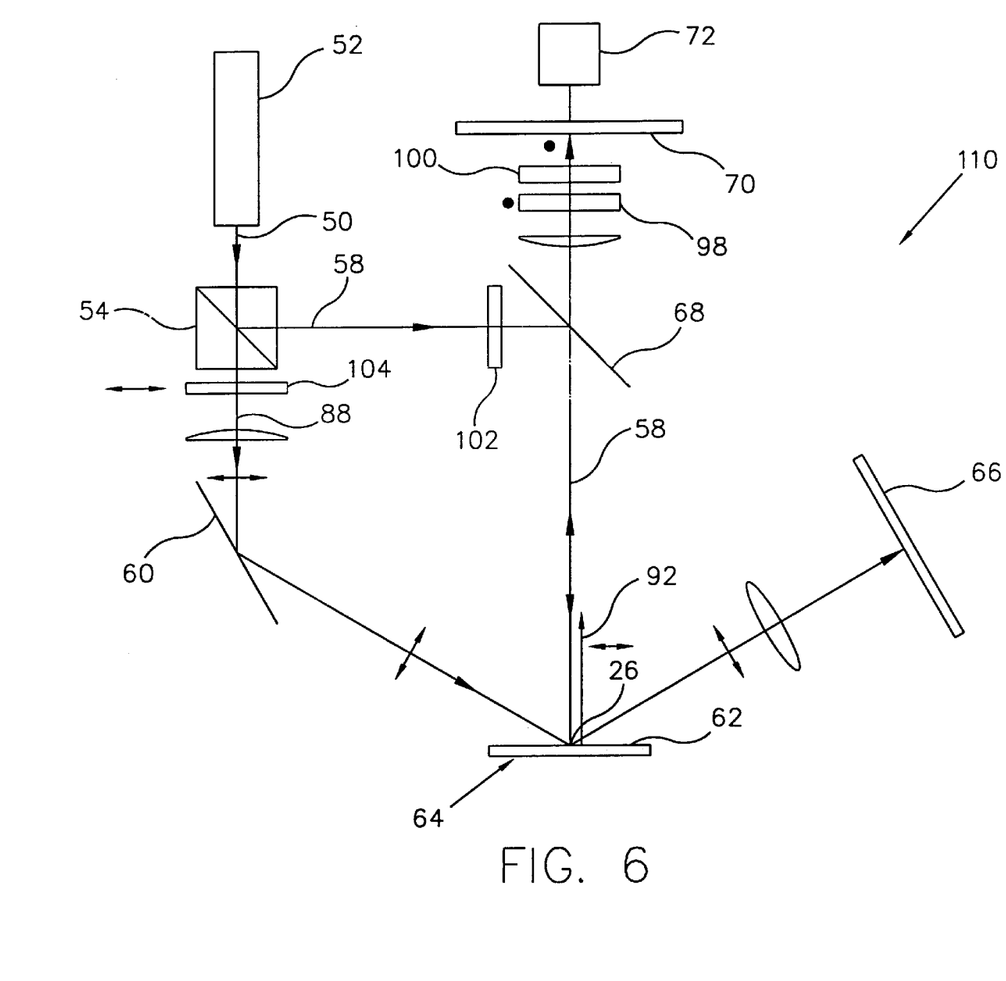
FIG. 6 is a schematic illustration of another embodiment of the invention, wherein two analyzers are utilized to reduce scattering of the sensor beam.

In another embodiment 110 of the invention, shown schematically in FIG. 6, a beam 50 is produced by a natural or unpolarized light source 52 and split by a beamsplitter 54, as in the prior-art device of FIG. 3. The point-range sensor beam is then polarized with a linear polarizer 104 to produce a P-state beam 88 used to carry out the point-range sensor measurements, as in the embodiment of FIG. 5, which may also produce scattered light 92. The autocollimator beam 58 emerging from the splitter 54 is folded by the splitter 68 and directed to the measurement point 26 on the test sample. Its unpolarized reflection, together with any scattered light from beam 92, is transmitted through the splitter 68 and then passed through an analyzer 98 adapted to block the linearly-polarized scattered light from beam 92 and convert the unpolarized beam 58 to linear light spotted on the detector 70, as in the first embodiment. Again, a rotating polarizer 100 is preferably also used to attenuate the intensity of the light shining on the detector 70 and a neutral density filter 102 may be used to block stray reflections from the laser 82.

Figure 7:
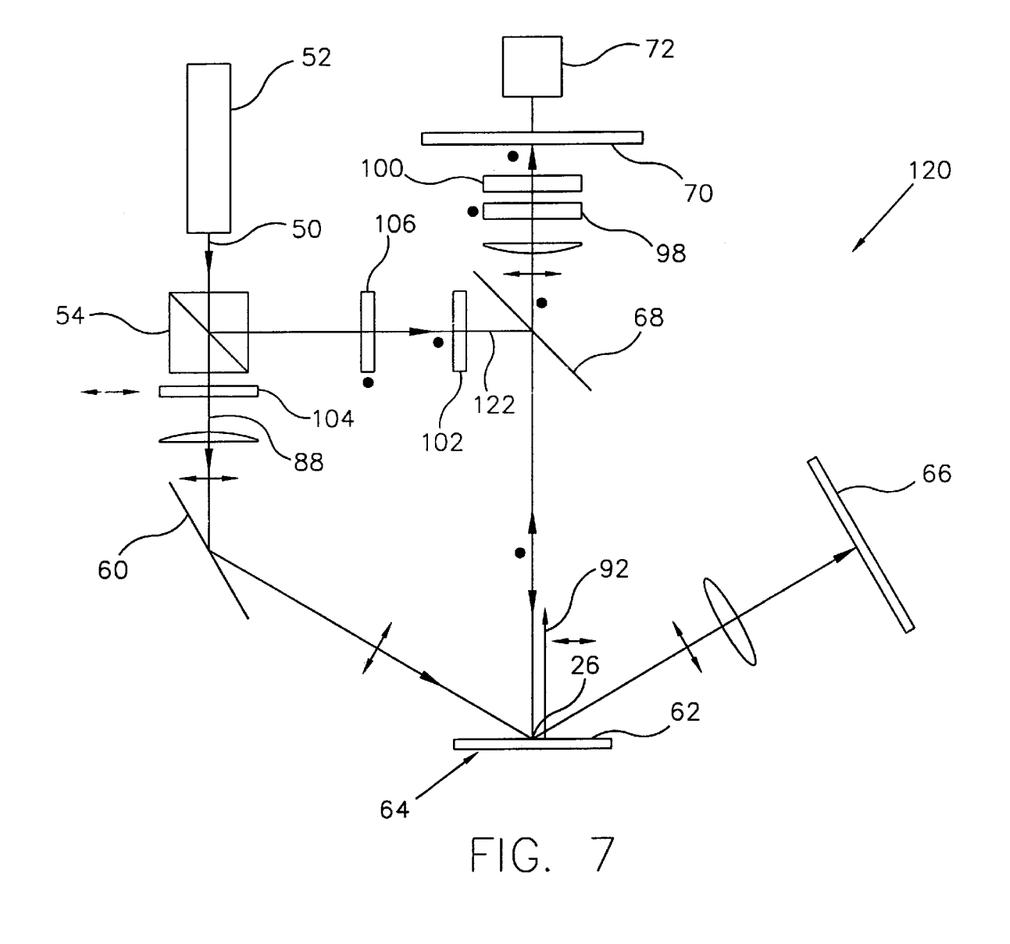
FIG. 7 is a schematic illustration of a third embodiment of the invention, wherein three analyzers are utilized to reduce scattering of the sensor beam.

FIG. 7 illustrates a third embodiment 120 of the invention, wherein a beam 50 is again produced by an unpolarized laser or other source 52 and split by a beamsplitter 54. The point-range sensor beam is then polarized with a linear polarizer 104 to produce a P-state beam 88 used to carry out the point-range sensor measurements, as in the embodiments of FIGS. 5 and 6, with possible attendant production of scattered light 92. The autocollimator beam emerging from the splitter 54 is also polarized in a linear polarizer 106 adapted to produce light 108 polarized in a plane perpendicular to the plane of beam 88. The autocollimator beam 122 is then folded by the splitter 68 and directed to the measurement point 26 on the test sample. Its linearly polarized reflection, together with any scattered light from beam 92 polarized in a perpendicular plane, is transmitted through the splitter 68 and passed through an analyzer 98 adapted to block the linearly-polarized scattered light from beam 92 and pass the linearly-polarized beam 122 to the detector 70.

Figure 8:
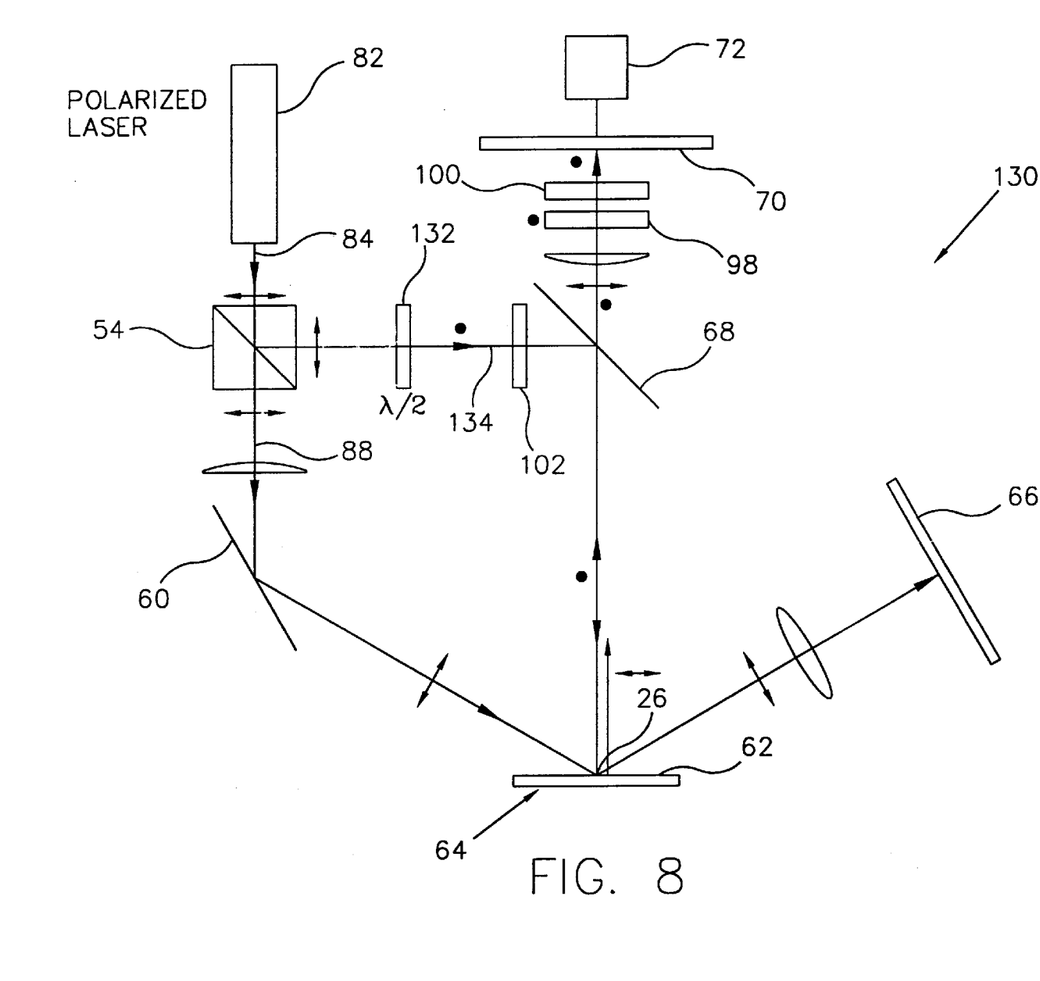
FIG. 8 is a schematic illustration of a fourth embodiment of the invention, wherein a polarized laser, a half-wave plate and an analyzer are utilized to reduce scattering of the sensor beam.

Another embodiment 130, which may be preferred because of its relatively low cost of implementation, is shown in FIG. 8. A polarized laser 82 is used to produce a linearly-polarized beam 84 that is split by a beamsplitter 54. Thus, the linearly-polarized point-range sensor beam 88 is used to carry out the point-range sensor measurements, as in the prior embodiments. The autocollimator beam emerging from the splitter 54 is passed through a half-wave plate 132 to convert it to a light beam 134 polarized in a plane perpendicular to the plane of beam 88. The autocollimator beam 132 is then folded by the splitter 68 and directed to the measurement point 26 on the test sample. Its linearly polarized reflection, together with any scattered light from beam 92 orthogonal to it, is transmitted through the splitter 68 and passed through an analyzer 98 adapted to block the linearly-polarized scattered light from beam 92 and pass the linearly-polarized beam 132 to the detector 70, as in the embodiment of FIG. 7.

Figure 9:
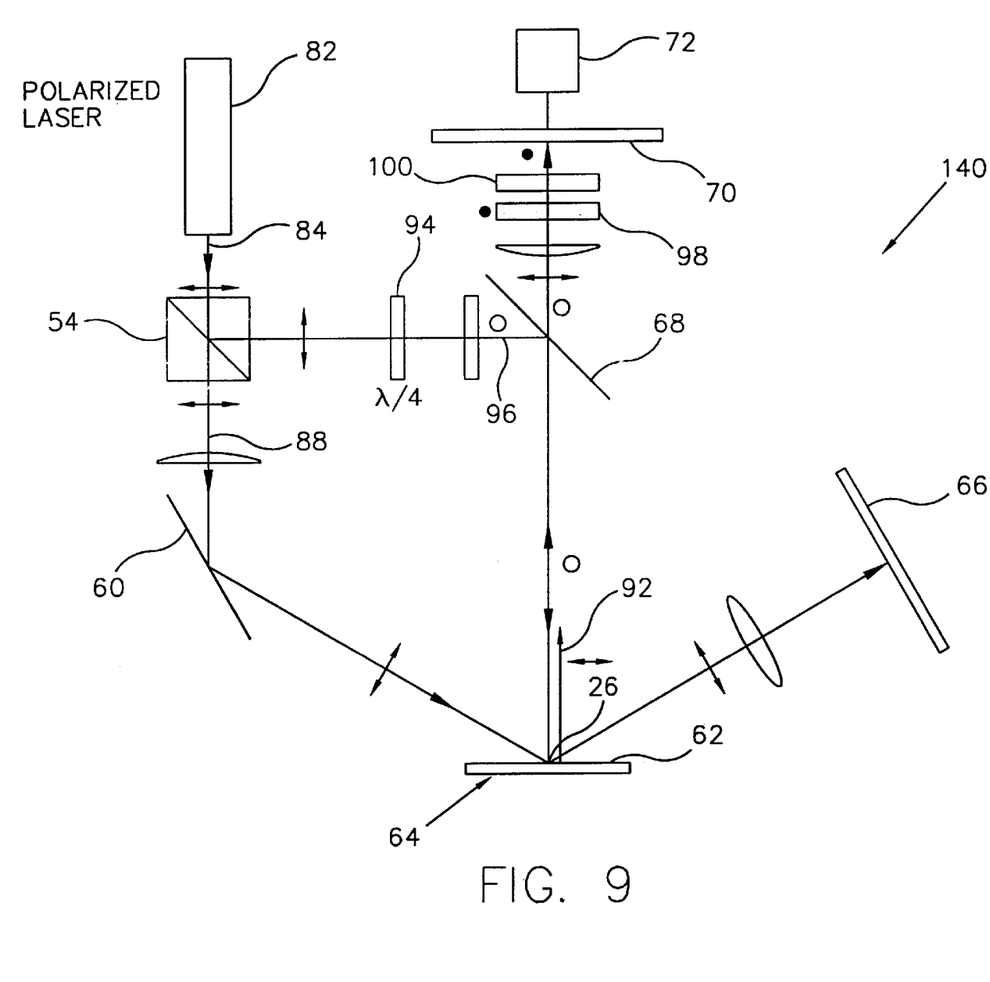
FIG. 9 is a schematic illustration of yet another embodiment of the invention, wherein a polarized laser, a quarter-wave plate and an analyzer are utilized to reduce scattering of the sensor beam.

A final embodiment 140 is shown in FIG. 9. This embodiment, which may also be preferred because of its low cost, comprises a polarized laser 82, which produces a linearly-polarized beam 84 split by the beamsplitter 54 into a point-range sensor beam and an autocollimator beam. The beamsplitter may consist of a polarizing beam splitter 86 (as seen in FIG. 5), which can be used to improve control of the fractions of light transmitted and reflected so as to achieve optimal proportions, as described above. The linearly-polarized point-range sensor beam 88 is used for point-range sensor measurements, as described above. The autocollimator beam emerging from the splitter 54 is passed through a quarter-wave plate 94 to convert it to a circularly-polarized beam 96. The autocollimator beam 96 is folded by the splitter 68 and directed to the measurement point 26 on the test sample. Its circularly-polarized reflection, together with any scattered light from beam 92, is again transmitted through the splitter 68 and passed through an analyzer 98 adapted to block the linearly-polarized scattered light from beam 92 and convert the circularly-polarized beam 96 to linearly-polarized light shone onto the detector 70, as in the embodiment of FIG. 5.

Figure 10:
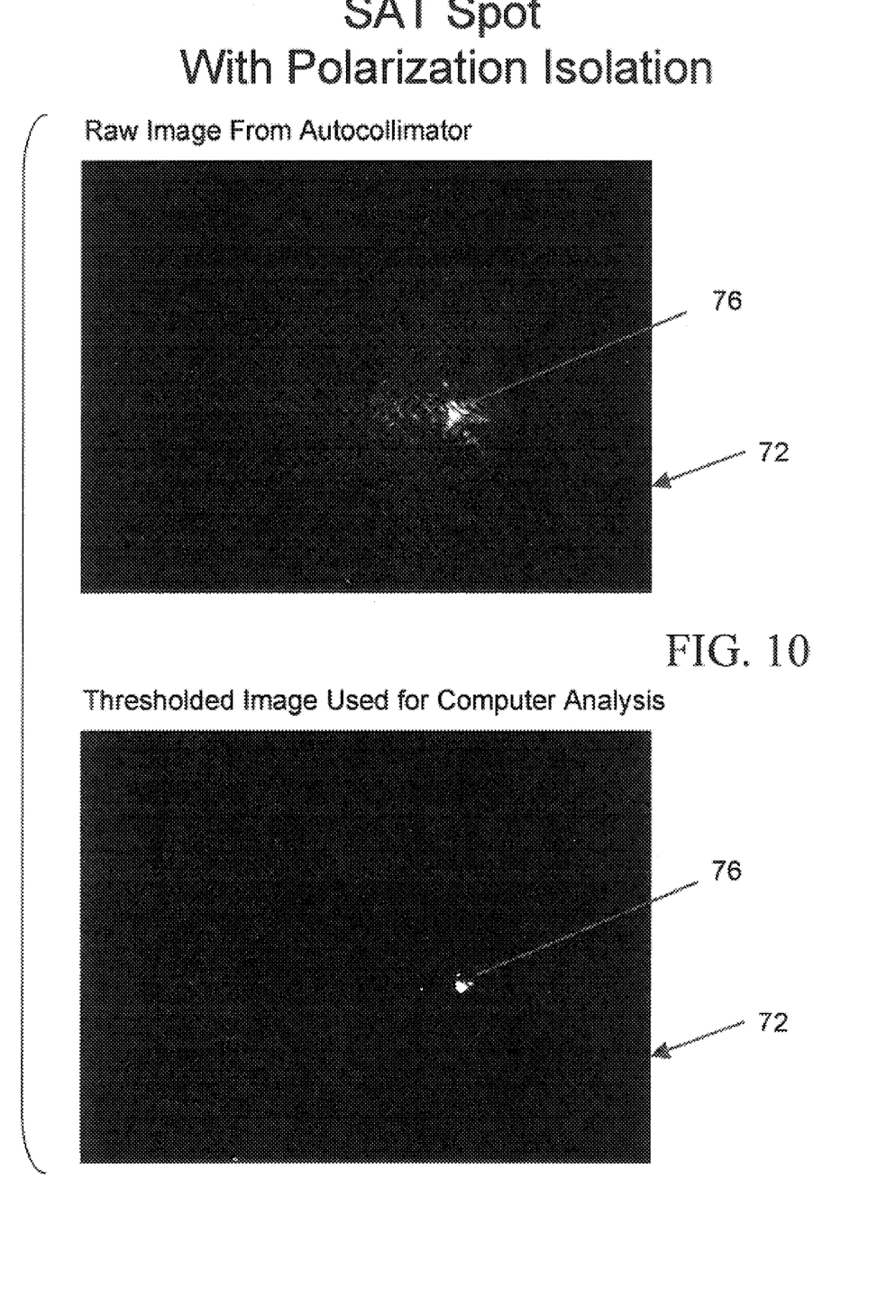
FIG. 10 is a display of the autocollimator beam produced by the device of FIG. 5, wherein the stray light has been blocked from clouding the image of the test point.

As mentioned above, in practice it is important to balance the relative intensities of the point-range sensor beam and the autocollimator beam in order to produce clear images on both detectors 66 and 70. To that end, it was determined that a good balance is obtained by splitting the light emitted from the source 52 (or 82) in an 80/20 ratio between the two, respectively. The intensity of the autocollimator beam shining on the detector 70 may also be fine-tuned by the use of the rotating polarizer 100, as necessary to obtain a clear image. Finally, stray reflections from the light source that may produce additional scattered light are preferably blocked or at least reduced by a weak neutral density filter 102 (shown in all embodiments). The results of the invention are illustrated in FIG. 10, wherein the image of the autocollimator light is seen in the form of a clear spot 76 unclouded by stray light from the point-range sensor beam.

It is understood that the concept of the invention could be implemented in similar fashion by any means of polarization that allowed differentiation between the autocollimator and the point-range sensor beams, such that scatter light from the latter could be blocked from reaching the autocollimator detector. It is also believed that the concept could similarly be implemented by utilizing multiple light sources with distinct polarization characteristics or by using color filters to differentiate the two beams on the basis of wavelength, rather than polarization.

Therefore, various changes in the details, steps and components that have been described may be made by those skilled in the art within the principles and scope of the invention herein illustrated and defined in the appended claims. While the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. In an optical device comprising a light source and a beam splitter producing a first wavefront and a second wavefront, wherein the first wavefront is scattered at a point of incidence on a reflective surface and interferes with said second wavefront, apparatus for eliminating the interference of the scattered light from said first wavefront with the second wavefront comprising, in combination:

polarizing means for producing a state of polarization in the first wavefront; and filter means for transmitting the second wavefront while blocking said polarized first wavefront prior to shining the second wavefront on a light detector.

2. The device recited in claim 1, wherein said polarizing means includes a polarized laser and said beam splitter to produce linearly-polarized first and second wavefronts and further comprises a quarter-wave plate for converting said linearly-polarized second wavefront into a circularly-polarized second wavefront, and wherein said filter means comprises an analyzer adapted to block said linearly-polarized first wavefront.

3. The device recited in claim 2, wherein said beam splitter is a polarized beam splitter.

4. The device recited in claim 2, further including a rotating polarizer to attenuate the second wavefront after passage through said analyzer.

5. The device recited in claim 2, further including a neutral density filter placed in an optical path of said second wavefront to attenuate stray reflections from said polarized laser.

6. The device recited in claim 3, further including a rotating polarizer to attenuate the second wavefront after passage through said analyzer, and including a neutral density filter placed in an optical path of said second wavefront to attenuate stray reflections from said polarized laser.

7. The device recited in claim 1, wherein said polarizing means includes a polarizer to produce a linearly-polarized first wavefront, and wherein said filter means comprises an analyzer adapted to block said linearly-polarized first wavefront.

8. The device recited in claim 7, further including a rotating polarizer to attenuate the second wavefront after passage through said analyzer.

9. The device recited in claim 7, further including a neutral density filter placed in an optical path of said second wavefront to attenuate stray reflections from said light source.

10. The device recited in claim 7, further including a rotating polarizer to attenuate the second wavefront after passage through said analyzer, and including a neutral density filter placed in an optical path of said second wavefront to attenuate stray reflections from said light source.

11. The device recited in claim 1, wherein said polarizing means includes a first polarizer to produce a linearly-polarized first wavefront and a second polarizer to produce a linearly-polarized second wavefront, said first and second wavefronts being polarized along orthogonal planes, and wherein said filter means comprises an analyzer adapted to block said linearly-polarized first wavefront.

12. The device recited in claim 11, further including a rotating polarizer to attenuate the second wavefront after passage through said analyzer.

13. The device recited in claim 11, further including a neutral density filter placed in an optical path of said second wavefront to attenuate stray reflections from said light source.

14. The device recited in claim 11, further including a rotating polarizer to attenuate the second wavefront after passage through said analyzer, and including a neutral density filter placed in an optical path of said second wavefront to attenuate stray reflections from said light source.

15. The device recited in claim 1, wherein said polarizing means includes a polarized laser and said beam splitter to produce linearly-polarized first and second wavefronts and further comprises a half-wave plate for introducing a 180° phase shift in said linearly-polarized second wavefront, and wherein said filter means comprises an analyzer adapted to block said linearly-polarized first wavefront.

16. The device recited in claim 15, further including a rotating polarizer to attenuate the second wavefront after passage through said analyzer.

17. The device recited in claim 15, further including a neutral density filter placed in an optical path of said second wavefront to attenuate stray reflections from said polarized laser.

18. The device recited in claim 15, further including a rotating polarizer to attenuate the second wavefront after passage through said analyzer, and including a neutral density filter placed in an optical path of said second wavefront to attenuate stray reflections from said polarized laser.

19. The device recited in claim 1, further including a rotating polarizer to attenuate the second wavefront after passage through said filter means.

20. The device recited in claim 1, further including a neutral density filter placed in an optical path of said second wavefront to attenuate stray reflections from said light source.

21. An autocollimator/point-range sensor system comprising the following components:

a light source;

a beam splitter aligned along an optical path of a light beam emitted by said light source and adapted to produce a point-range sensor wavefront and an autocollimator wavefront;

polarizing means for producing a state of polarization in the point-range sensor wavefront; and filter means for transmitting the autocollimator wavefront while blocking the point-range sensor wavefront prior to shining the autocollimator wavefront on a light detector;

thereby eliminating interference on the light detector of scattered light from said point-range sensor wavefront with the autocollimator wavefront.

22. The device recited in claim 21, further including a rotating polarizer to attenuate the autocollimator wavefront after passage through said filter means.

23. The device recited in claim 21, further including a neutral density filter placed in an optical path of said autocollimator wavefront to attenuate stray reflections from said light source.

24. The device recited in claim 21, further including a rotating polarizer to attenuate the autocollimator wavefront after passage through said filter means, and including a neutral density filter placed in an optical path of said autocollimator wavefront to attenuate stray reflections from said light source.

25. A method for eliminating scattered light from a first wavefront aligned along an optical axis with a second wavefront, comprising the following steps:

polarizing the first wavefront ahead of the point of incidence producing said scattered light; and blocking said first wavefront with an analyzer while transmitting the second wavefront along said optical axis.

26. The method of claim 25, wherein said polarizing step is carried out with a polarized laser to produce a linearly-polarized first wavefront, and wherein said blocking step is carried out with an analyzer adapted to block said linearly-polarized first wavefront.

27. The method of claim 25, wherein said polarizing step is carried out with a polarizer to produce a linearly-polarized first wavefront, and wherein said blocking step is carried out with an analyzer adapted to block said linearly-polarized first wavefront.

* * * * *